US012422131B1

(12) United States Patent
Vasquez et al.

(10) Patent No.: US 12,422,131 B1
(45) Date of Patent: Sep. 23, 2025

(54) MAGNETICALLY MOUNTED DECORATIVE APPARATUS OPTIMIZED TO REMAIN MOUNTED ON A METALLIC GARAGE DOOR AND ASSOCIATED METHOD OF MANUFACTURE

(71) Applicants: Robert Vasquez, Gilbert, AZ (US); Yanbei Qin, Ningbo (CN)

(72) Inventors: Robert Vasquez, Gilbert, AZ (US); Yanbei Qin, Ningbo (CN)

( * ) Notice: Subject to any disclaimer, the term of this patent is extended or adjusted under 35 U.S.C. 154(b) by 0 days.

(21) Appl. No.: 18/801,884

(22) Filed: Aug. 13, 2024

(51) Int. Cl.

| | |
|---|---|
| ***F21V 21/096*** | (2006.01) |
| ***F21S 9/03*** | (2006.01) |
| ***F21V 23/00*** | (2015.01) |
| ***F21V 23/04*** | (2006.01) |
| ***F21W 121/00*** | (2006.01) |
| ***F21Y 115/10*** | (2016.01) |
| ***G09F 7/04*** | (2006.01) |

(Continued)

(52) U.S. Cl.
CPC ............ *F21V 21/096* (2013.01); *F21S 9/032* (2013.01); *F21S 9/037* (2013.01); *F21V 23/001* (2013.01); *F21V 23/0407* (2013.01); *F21V 23/0435* (2013.01); *G09F 7/04* (2013.01); *G09F 13/045* (2021.05); *F21W 2121/004* (2013.01); *F21Y 2115/10* (2016.08); *G09F 2007/1852* (2013.01)

(58) Field of Classification Search
CPC ...... F21V 21/096; F21V 21/0965; F21S 4/10; F21S 4/15; F21W 2121/00; G09F 13/045; G09F 7/04; G09F 2007/1852
See application file for complete search history.

(56) References Cited

U.S. PATENT DOCUMENTS

| | | | |
|---|---|---|---|
| 4,537,806 A | 8/1985 | Sherrard | |
| 5,123,223 A | 6/1992 | Makarevich et al. | |

(Continued)

FOREIGN PATENT DOCUMENTS

| | | | | |
|---|---|---|---|---|
| DE | 20205802 U1 * | 8/2002 | ............... | F21K 2/00 |
| WO | 2009121909 A1 | 10/2009 | | |

OTHER PUBLICATIONS

US Trademark Registration No. 4145999; Mark—Blazing Ledz Filing date: Sep. 16, 2011 Registration date: May 22, 2012.

(Continued)

*Primary Examiner* — Alexander K Garlen
(74) *Attorney, Agent, or Firm* — LegalForce RAPC Worldwide

(57) ABSTRACT

Holiday apparatuses and methods of manufacture of the same are described, and more particularly to a magnetically mounted holiday apparatus optimized to prevent jamming of a metallic garage door, and its associated methods of manufacture. In one embodiment, a holiday apparatus comprises a front formed of a translucent material in which a light source within a cavity illuminates the holiday apparatus. The front may be primarily formed from a single mold process in which the translucent material is manipulated in a form of the front. A back may be formed from a plastic material. The back may be attached to the front to form the cavity between the front and the back and when the front and the back are attached, an apparatus depth may be less than a door clearance to ensure the holiday apparatus does not impede movement of a garage door by contacting a top portion.

20 Claims, 10 Drawing Sheets

(51) Int. Cl.
*G09F 7/18* (2006.01)
*G09F 13/04* (2006.01)

(56) References Cited

U.S. PATENT DOCUMENTS

| | | | | | |
|---|---|---|---|---|---|
| 5,263,529 | A | | 11/1993 | Landis | |
| 5,611,382 | A | | 3/1997 | Sferra | |
| 5,624,181 | A | | 4/1997 | Miller et al. | |
| 5,666,712 | A | | 9/1997 | Cvetkov | |
| 5,943,803 | A | | 8/1999 | Zinbarg | |
| 6,013,346 | A | * | 1/2000 | Lewis | G09F 9/33 428/42.1 |
| D425,820 | S | | 5/2000 | Coleman | |
| 6,073,375 | A | | 6/2000 | Fant et al. | |
| 6,116,752 | A | | 9/2000 | Mayfield et al. | |
| 6,367,204 | B1 | | 4/2002 | Eichler | |
| 6,395,369 | B1 | | 5/2002 | Randone | |
| 6,402,336 | B1 | | 6/2002 | Reese | |
| 6,572,238 | B1 | * | 6/2003 | Johnson | B44C 5/04 362/147 |
| D497,323 | S | | 10/2004 | Novak | |
| 8,273,441 | B2 | | 9/2012 | Deaton | |
| 8,523,380 | B1 | * | 9/2013 | Grant | F21V 21/096 362/184 |
| 9,903,570 | B2 | | 2/2018 | Snowden | |
| 10,436,438 | B1 | * | 10/2019 | Eagan | F21V 23/0414 |
| 11,738,593 | B2 | | 8/2023 | Webster, III | |
| 2003/0005656 | A1 | | 1/2003 | Kim et al. | |
| 2003/0117800 | A1 | * | 6/2003 | Huang | F21V 3/00 362/249.16 |
| 2003/0210555 | A1 | * | 11/2003 | Cicero | B44C 5/005 362/555 |
| 2003/0213567 | A1 | | 11/2003 | Markley | |
| 2005/0076591 | A1 | | 4/2005 | Koeller | |
| 2006/0027344 | A1 | | 2/2006 | Lampe et al. | |
| 2007/0062136 | A1 | | 3/2007 | Kim et al. | |
| 2009/0213582 | A1 | * | 8/2009 | Thomas | F21V 21/0965 362/183 |
| 2009/0213586 | A1 | * | 8/2009 | Peng | B60Q 1/2615 362/234 |
| 2012/0222340 | A1 | * | 9/2012 | Paquette | G09F 13/02 40/541 |
| 2013/0099698 | A1 | * | 4/2013 | Podd | H05B 47/105 315/297 |
| 2013/0271968 | A1 | * | 10/2013 | Wegrzyn | B44C 5/00 362/190 |
| 2016/0091185 | A1 | * | 3/2016 | Soderholm | F21S 2/00 362/11 |
| 2018/0320839 | A1 | * | 11/2018 | Briscoe | F21V 31/005 |
| 2020/0224841 | A1 | * | 7/2020 | van Olst | F21V 23/002 |
| 2021/0025576 | A1 | * | 1/2021 | Park | F21V 17/02 |

OTHER PUBLICATIONS

US Trademark Registration No. 5412918; Mark—Shawshank Ledz Filing date: Aug. 9, 2017 Registration date: Feb. 27, 2018.

US Trademark Registration No. 4244511; Mark—Blacklight Master Filing date: Sep. 16, 2011 Registration date: Nov. 20, 2012.

US Trademark Registration No. 4025874; Mark—Scorpion Master Filing date: Feb. 16, 2011 Registration date: Sep. 13, 2011.

"Halloween Pumpkin Garage Decoration", by Shawshank Ledz, Published Online in [Aug. 28, 2023] https://shawshankledz.com/images/P/768313-D-Pumpkin%20Garage%20Decor%20MOCK%20CMYK.jpg.

"Halloween Spiderweb Garage Decoration", by Shawshank Ledz, Found Online in [Nov. 4, 2024] https://shawshankledz.com/images/P/768315-D-Spider%20Garage%20Decor%20MOCK%20CMYK.jpg.

"Halloween Bat Garage Decoration", by Shawshank Ledz, Found Online in [Nov. 4, 2024] https://shawshankledz.com/images/P/768314-D-Bat%20Garage%20Decor%20CMYK.jpg.

"Lighted Halloween Window Decorations, 14" Light up Halloween Window Lights Window Silhouette Pumpkin Sign for Halloween Party Decor with 10 LEDs", by Roseeyo, Found Online in [Nov. 4, 2024] https://m.media-amazon.com/images/I/71q76WIsATL._SX679_.jpg.

"Halloween Garage Door Decorations Magnets Huge Spider", by Rossorha, Found Online in [Nov. 4, 2024] https://m.media-amazon.com/images/I/71sXaor6ZDL._AC_SX679_.jpg.

"Halloween Decorations Garage Door Magnets", by Rossorha, Found Online in [Nov. 4, 2024] https://m.media-amazon.com/images/I/81my3S3wgxL._AC_SX679_.jpg.

* cited by examiner

MAGNETICALLY MOUNTED DECORATIVE APPARATUS OPTIMIZED TO REMAIN MOUNTED ON A METALLIC GARAGE DOOR AND ASSOCIATED METHOD OF MANUFACTURE

FIELD OF TECHNOLOGY

This disclosure relates generally to the field of mounted decorative apparatuses and methods of manufacture of the same, and more particularly to a magnetically mounted decorative apparatus optimized to remain mounted on a metallic garage door and associated method of manufacture.

BACKGROUND

A holiday decoration may be an artistic work that may include functional elements that celebrate a season, cultural event, a religious event, etc. Holiday decorations may be designed to attach to one's residence, landscaping, and/or other property features. Holiday decorations may be important societal fixtures that may benefit both communities as a whole and the occupants who are doing the decorating. Holiday decorations may help create a festive and/or cheerful atmosphere during the holiday season. The visual appeal of decorations like lights, wreaths, and/or ornaments may bring joy and/or a sense of celebration to a neighborhood while promoting a sense of community and togetherness. Holiday decorations may be related to long standing traditions in many cultures.

These decorations may connect individuals and/or families to their cultural and/or religious heritage and may be a way of passing down traditions to future generations. For many, decorating their homes for the holidays may be an opportunity to express their creativity and/or personal style. Holiday decorations may allow occupants to showcase their unique ideas and preferences in a public way, adding a personal touch to their surroundings. Furthermore, holiday decorations may serve practical purposes, such as helping visitors find a location or directing traffic.

A garage door may be a movable, paneled metallic door that encloses one's garage space and/or other partially enclosed property feature. Garage doors may be arranged in a paneled configuration to provide a flexible and/or interconnected barrier that allows for a controlled vertical movement and/or horizontal door movement. The panels may be arranged in horizontal sections that are hinged and/or interconnected. The hinges may allow the panels to pivot and/or fold as the door is operated. The panels may be connected to rollers that run along tracks and/or rails on each side of the garage opening. These tracks may guide the panels and keep them in a straight path as they move upwardly and/or outwardly. The tracks may be hung on the ceiling and/or the wall of the garage which may allow the garage to sit horizontally parallel to the ceiling. Garage doors may also comprise numerous other mechanical features such as torsion springs, counterbalance systems, reversible motors and openers, and/or control mechanisms.

Garage doors may be important to a household for many reasons. Garage doors may secure property, including vehicles, tools, and/or other valuable items stored in the garage. A properly functioning garage door may act as a barrier to unauthorized access and potential theft. Garage doors may protect the interior of the garage from the elements, including but not limited to rain, snow, wind, and extreme temperatures. This may be crucial for maintaining the condition of vehicles, equipment, and/or belongings stored in the garage. Furthermore, the garage may be connected to the house and thus serve as a fire barrier. In the event of a fire in the garage, a functioning garage door may help prevent the spread of flames to the living space of the house.

Unfortunately, garage doors may be susceptible to damage from obstructions. Obstructions, whether on and/or near the garage door and/or the garage door's mechanical features, may damage the frame of the garage, damage the garage door paneling, and/or damage property underneath the upper frame of the garage opening including but not limited to a vehicle and/or other stored items. If an obstruction damages the garage door, the homeowner and/or occupant may suffer significant harm.

A damaged garage door may be expensive to fix and/or replace. A damaged garage door may also pose a safety hazard. For example, if an obstruction damages the garage door and/or the garage door's supporting hardware, the homeowner may be susceptible to burglary and/or other crimes. A damaged garage door may also allow ingress and egress of animals and/or bugs, which may lead to infestation and/or the spread of disease. A damaged garage door may decrease a home's energy efficiency by allowing hot and/or cold air to enter one's home, which may result in significant utility bill increases. A damaged garage door may lead to further property damage due to partial or complete collapsing of the door. A collapsing garage door may not only damage property below, but also cause harm to an individual, which may result in medical bills, insurance settlements, and/or lawsuits. A damaged garage door may also cause daily inconveniences including but not limited to longer cooler/warming times for a vehicle due to parking outdoors, extra time spent deicing vehicle windows, and/or time and effort spent entering and leaving the home.

As such, garage doors may be left bare.

SUMMARY

In one aspect, a holiday apparatus includes a front formed of a translucent material in which a light source within a cavity illuminates the holiday apparatus. The front is primarily formed from a single mold process in which the translucent material is manipulated in the form of the front. A back is formed from a plastic material. The back is attached to the front to form the cavity between the front and the back. When the front and the back are attached, an apparatus depth is less than a door clearance to ensure the holiday apparatus does not impede the movement of a garage door by contacting a top portion. The apparatus depth is less than 2.25 inches.

The light-emitting diode is affixed in the cavity and serves as the light source. An electrical wire is located within the cavity and is connected to a power source and the light-emitting diode. A battery serves as the power source. The battery provides an electrical current carried through the electrical wire to the light-emitting diode affixed within the cavity. The magnet is affixed to an exterior portion of the back to removably attach the holiday apparatus to the garage door. The magnet is of a strength to support the apparatus during movement of the garage door.

The light-emitting diode may comprise an OFF mode, a constant ON mode, and/or at least one flashing mode. A button may toggle the light-emitting diode between the OFF mode, the constant ON mode, and/or the at least one flashing mode. A timer may set time intervals between the constant ON mode, the OFF mode, and/or the at least one flashing mode. The battery may be charged by a solar power generation unit that may be at least partially embedded within the cavity. The battery may be charged by an external solar power generation unit that may be connected to the battery via a power cord. The holiday apparatus may include an adhesive, a plastic melt bond, a solder, a clamp, a hook-and-loop fastener, a clip, and/or a formed fit cavity which may connect the light-emitting diode to an interior portion of the back. A remote control system may be connected to the battery. A remote receiver may be at least partially embedded within the cavity and may toggle the light-emitting diode between the OFF mode, the constant ON mode, and/or the at least one flashing mode. The back may be made from a corrugated plastic, a foamed plastic, a honeycomb panel, a fiberglass reinforced panel, and/or a PVC board.

In another aspect, a method of manufacturing a holiday apparatus includes forming a front through a single mold process in which a translucent material is manipulated in the form of a decorative design. The translucent material is a material in which a light within a cavity of the holiday apparatus illuminates the holiday apparatus interiorly and exteriorly.

A back is attached to the front to form the cavity of the holiday apparatus. A plurality of light-emitting diodes are affixed in the cavity of the holiday apparatus. A compartment is at least partially embedded into the back and the cavity. The compartment is formed to include a button on the exterior portion of the compartment. A battery is placed in the compartment. The plurality of light-emitting diodes are connected to the battery via an electrical wire. A magnet is affixed to an exterior portion of the back to removably attach the holiday apparatus to a metal surface.

The button may toggle the light-emitting diode between an OFF mode, a constant ON mode, and/or at least one flashing mode. A timer may be embedded within the compartment. The timer may be electronically attached to the battery. The timer may set time intervals between the constant ON mode, the OFF mode, and/or the at least one flashing mode. The battery may be charged by a solar power generation unit at least partially embedded within the front and the cavity and connected to the battery via a second electrical wire. The plurality of light-emitting diodes may be affixed to an interior portion of the back by an adhesive, a plastic melt bond, a solder, a clamp, a hook-and-loop fastener, a clamp, a clip, and/or a formed fit cavity.

In yet another aspect, a holiday apparatus includes a front formed of a translucent material in which a light source within a cavity illuminates the holiday apparatus. The front is formed from a single mold process in which the translucent material is manipulated in the form of the front. A back is formed from a plastic material. The back is attached to the front by an adhesive to form the cavity between the front and the back. The apparatus depth formed by adhering the back to the front is less than 2.25 inches. A plurality of light-emitting diodes that serve as the light source and are affixed to an interior portion of the back. A compartment containing a battery that serves as a power source. The compartment is at least partially embedded through an exterior of the back into the cavity to allow access to the battery.

A first electrical wire is affixed to an interior portion of the back electrically connecting the plurality of light-emitting diodes to the battery. The battery provides an electrical current carried through the first electrical wire to the plurality of light-emitting diodes which are affixed within the cavity to the interior portion of the back. A solar power generation unit is at least partially embedded within the front and the cavity. The solar power generation unit charges the battery and is electrically attached to the battery via a second electrical wire. A timer housed within the compartment is electronically connected to the battery to automatically toggle the light-emitting diode between at least an OFF mode, a constant ON mode, and/or at least one flashing mode. At least two magnets are affixed to the exterior of the back to removably attach the holiday apparatus to a garage door.

The compartment may protect against the entry of solid objects larger than 1 mm, and the compartment may protect against splashing water from any direction. A button may toggle the light-emitting diode between the OFF mode, the constant ON mode, and/or the at least one flashing mode. A remote control system may be connected to the battery. A remote receiver may be at least partially embedded within the compartment and may toggle the light-emitting diode between the OFF mode, the constant ON mode, and/or the at least one flashing mode. The plurality of light-emitting diodes may be affixed to the interior portion of the back by at least one of an adhesive, a plastic melt bond, a solder, a clamp, a hook-and-loop fastener, a clip, and/or a formed fit cavity. The timer may be controlled by a dusk to dawn sensor.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Holiday decorations and methods of manufacture of the same are described, and more particularly to a holiday decoration in the form of a magnetically mounted decoration, and its associated methods of manufacture.

Figure 1A:
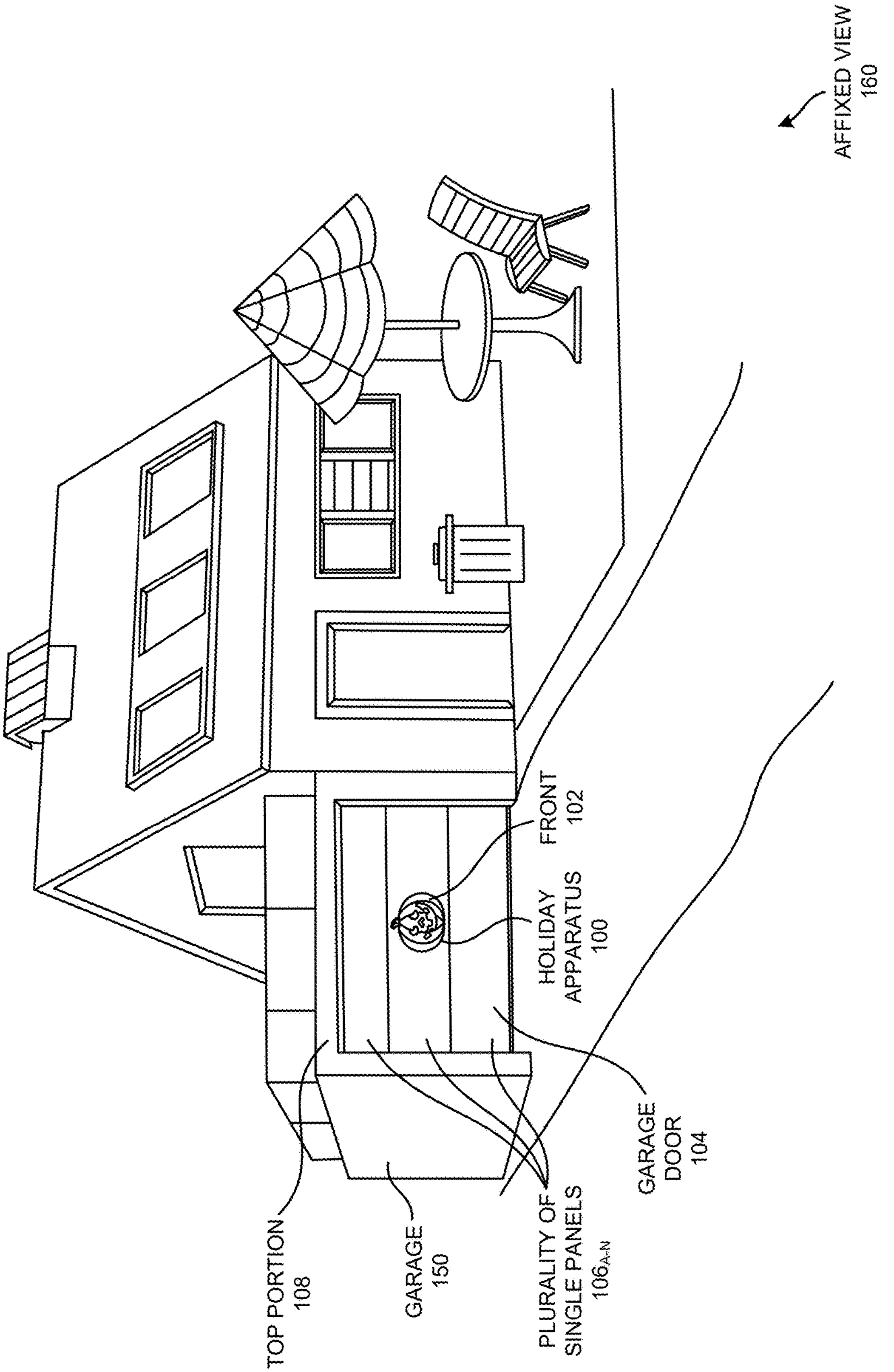
FIG. 1A is an affixed view of a holiday apparatus, according to one embodiment.

FIG. 1A is an affixed view of a holiday apparatus 100, according to one embodiment. FIG. 1A illustrates the holiday apparatus 100, a front 102, a garage door 104, a plurality of single panels 106A-N, a top portion 108, and a garage 150.

As shown in FIG. 1A, the front 102 may be formed during a single mold process in which translucent material is manipulated in the form of the holiday apparatus 100. The garage door 104 may be a raised panel garage door, a recessed panel garage door, a flush panel garage door, a carriage house garage door, a beadboard panel garage door, a mission style garage door, a lattice panel garage door, a custom panel garage door, and/or a combination panel garage door. The plurality of single panels 106A-N may be the individual sections that comprise the garage door 104 and/or may be oriented in a vertical, horizontal, diagonal, square, and/or triangular orientation.

The top portion 108 may be a header, a lintel, an upper beam, a roof, a ceiling, an overhang and/or a horizontal overhang in which the single panels 106A-N may be moved below. The garage 150 may be an attached garage, a detached garage, an integrated garage, a workshop garage, a multi-car garage, a tandem garage, a RV garage, a boat garage, a storage garage, a guest house garage, and/or a green garage.

In one aspect, the holiday apparatus 100 may include a front 102 formed of a translucent material in which a light source 406A-N (not shown) within a cavity 302 (not shown) illuminates the holiday apparatus 100. The front 102 may be primarily formed from a single mold process in which the translucent material is manipulated in the form of the front 102. The holiday apparatus 100 may be mounted on a single panel 106 of the garage door 104. When the garage door 104 is in a rolled-down state, the holiday apparatus 100 may be mounted on the garage door 104 such that it will not fall off of the single panel 106.

Figure 1B:
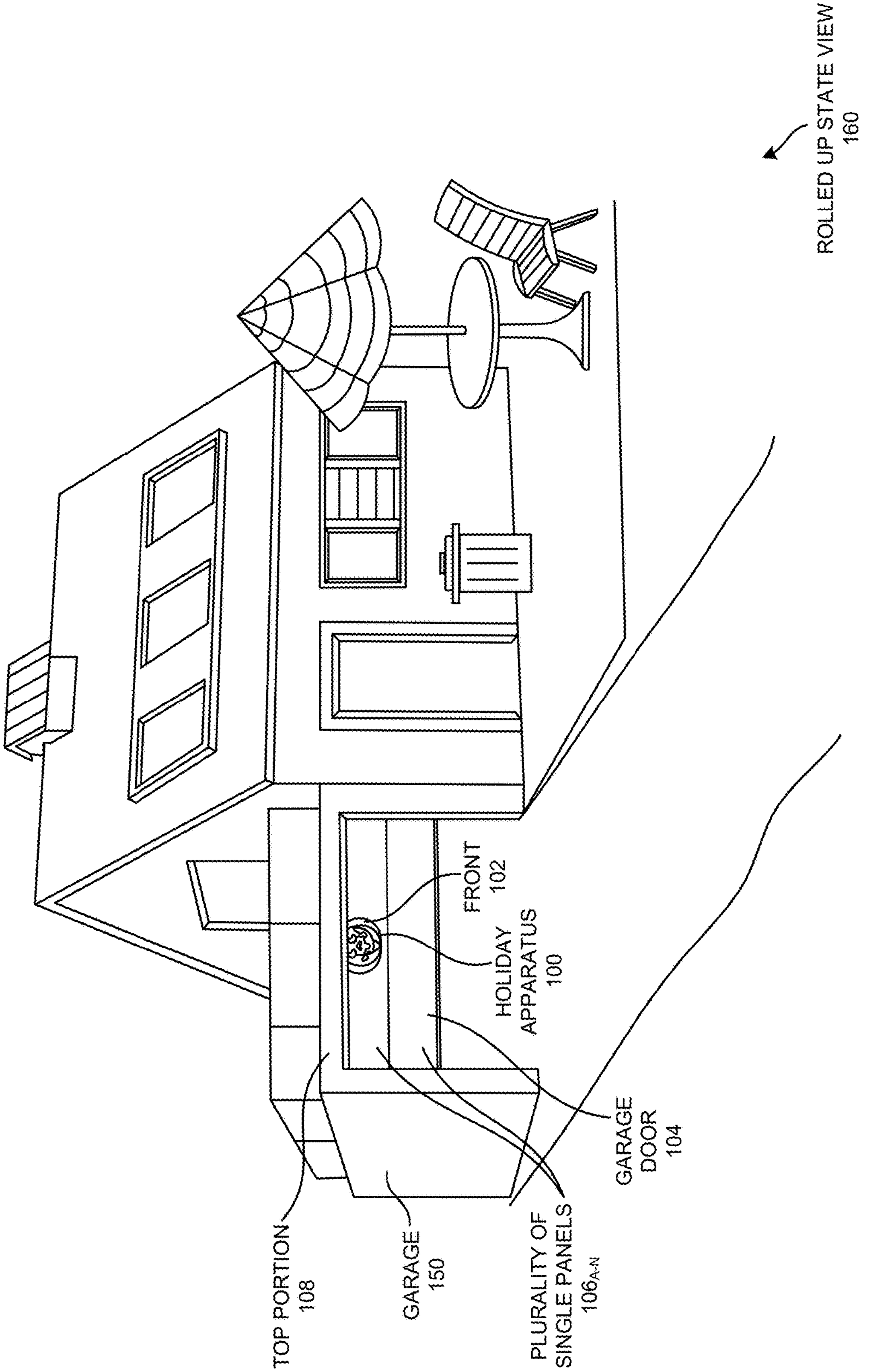
FIG. 1B is a rolled-up state view of the holiday apparatus of FIG. 1A, according to one embodiment.

FIG. 1B is a rolled-up state view of the holiday apparatus 100 of FIG. 1A, according to one embodiment. FIG. 1A illustrates the holiday apparatus 100, the front 102, the garage door 104, the plurality of single panels 106A-N, the top portion 108, and the garage 150.

As shown in FIG. 1B, the garage 104 may pass under the top portion 108 and the holiday apparatus 100 may stay attached to the single panel 106. The holiday apparatus 100 may not contact the top portion 108 as the garage door 104 rolls up and down, thus allowing the holiday apparatus 100 stay attached to the single panel 106 of the garage 150.

Figure 2:
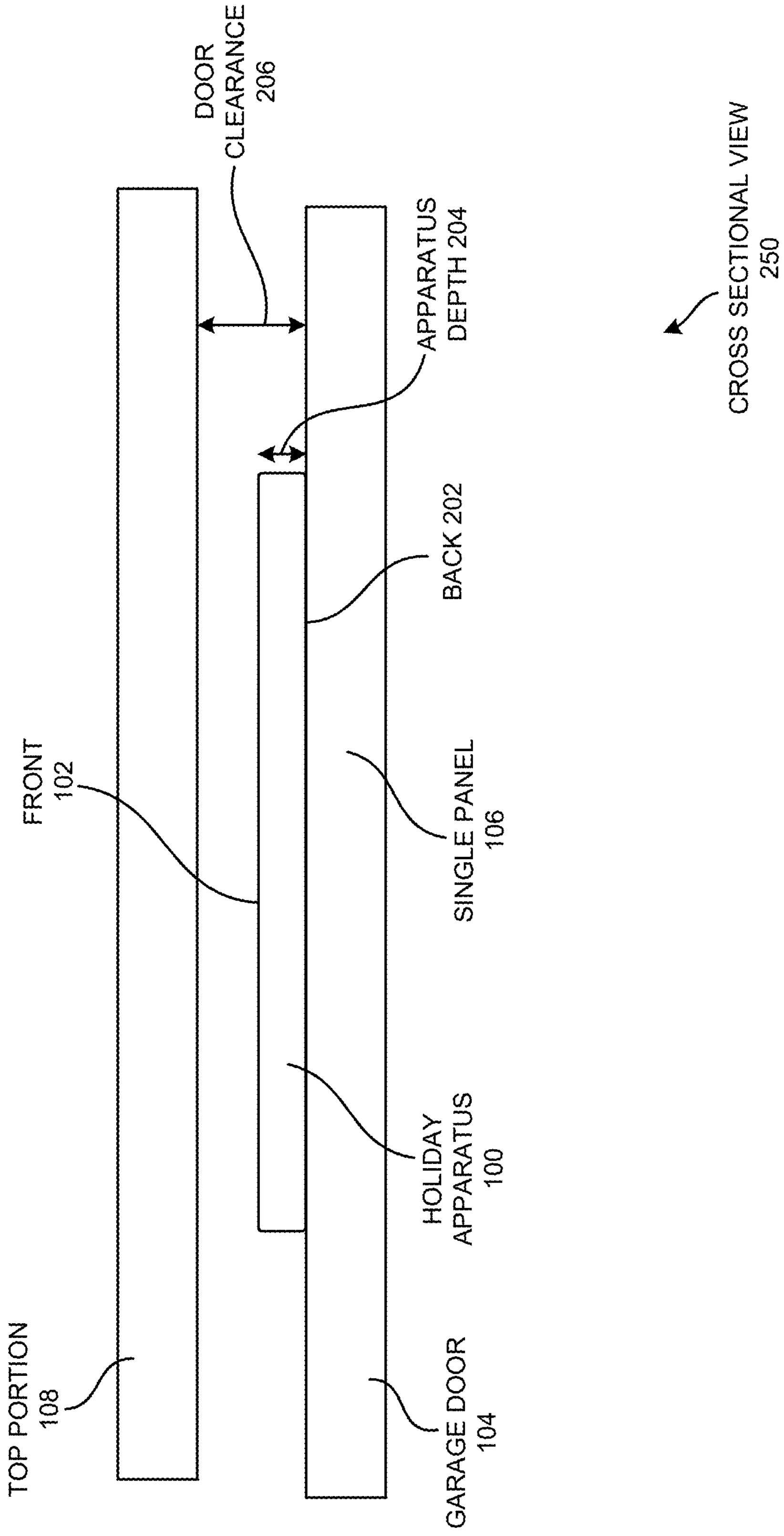
FIG. 2 is a cross-sectional view of the holiday apparatus of FIGS. 1A and 1B, according to one embodiment.

FIG. 2 is a cross-sectional view of the holiday apparatus 100 of FIG. 1A and FIG. 1B, according to one embodiment. FIG. 2 illustrates the holiday apparatus 100, the front 102, the garage door 104, the single panel 106, a back 202, an apparatus depth 204, and a door clearance 206

As shown in FIG. 2, the back 202 may be attached to the front 102 by various means including but not limited to an adhesive, a screw, a clip, a fastener, a rivet, and/or a tape to form the cavity 302 (not shown) between the front 102 and the back 202. The back 202 may be the rear most portion of the apparatus 100 and may be formed from a single mold process. The back 202 may be made from a corrugated plastic, a foamed plastic, a honeycomb panel, a fiberglass reinforced panel, and/or a PVC board.

The apparatus depth 204 may be the depth of the holiday apparatus 100 when the front 102 and/or the back 202 are attached to one another and/or attached to the single panel 106 of the garage door 104. The apparatus depth 204 formed by attaching the back 202 to the front 102 may be less than 1.5 inches. The apparatus depth 204 may be less than 2.25 inches. The door clearance 206 may be the distance between the top portion 108 and the garage door 104 as the garage door 104 is moved to and from an open and closed state.

As shown in FIG. 2, when the front 102 and the back 202 are attached, an apparatus depth 204 may be less than a door clearance 206 to ensure the holiday apparatus 100 does not impede the movement of the garage door 104 by contacting the top portion 108.

The front 102 may be attached to the back 202 and may protect the various components wholly and/or partially contained within the cavity 302 (not shown). The front 102 may be a translucent material and may allow light to pass through when a light source is being powered by a power source.

Figure 3:
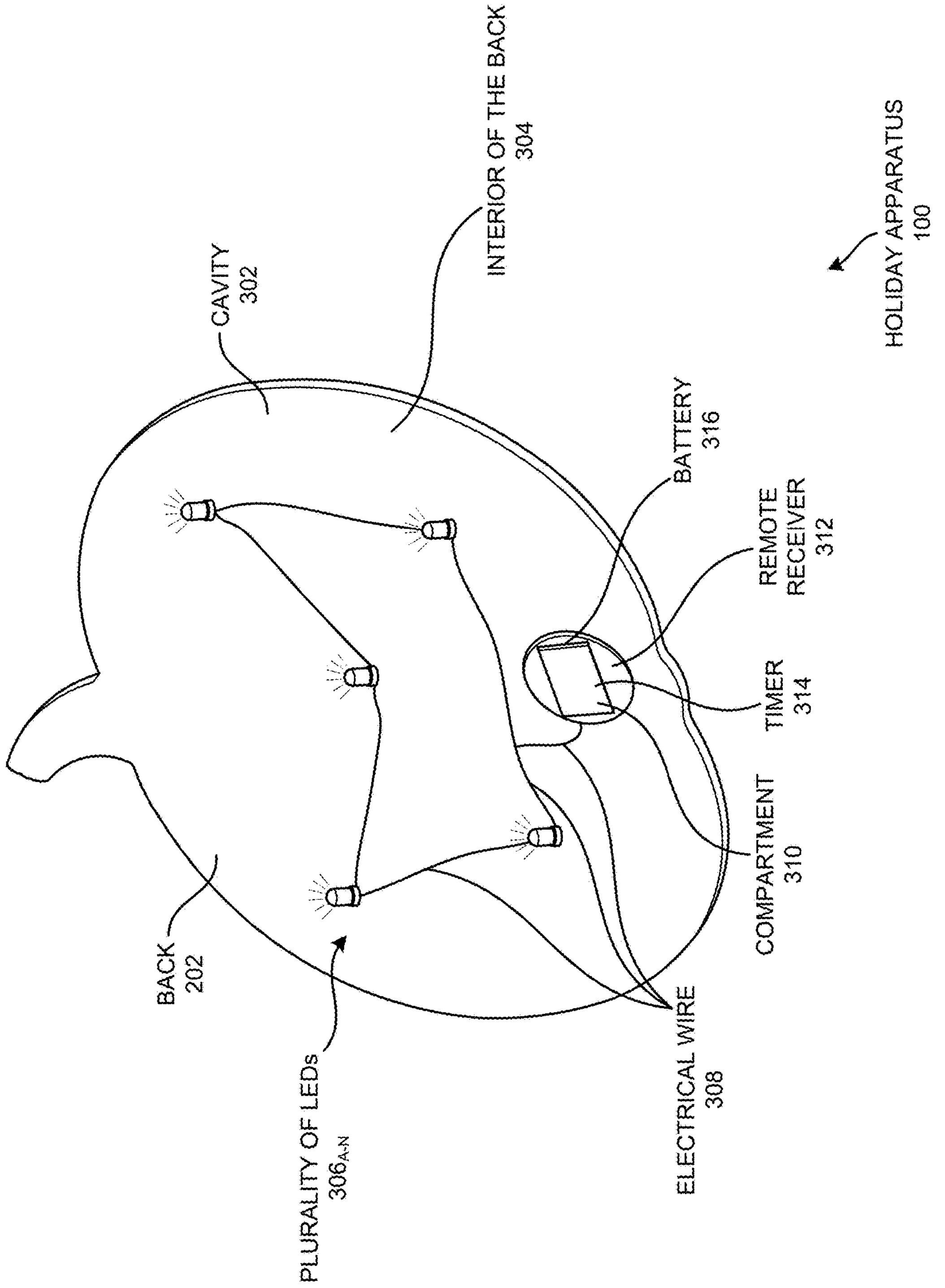
FIG. 3 is an internal view of the holiday apparatus of FIG. 1A-FIG. 2 in which the interior of the back is exposed, according to one embodiment.

FIG. 3 is an internal view of the holiday apparatus 100 of FIG. 1A-FIG. 2 in which the interior of the back 304 is exposed, according to one embodiment. FIG. 3 illustrates the back 202, a cavity 302, an interior of the back 304, a plurality of light-emitting diodes (hereinafter "LEDs") 306A-N, an electrical wire 308, a compartment 310, a remote receiver 312, a timer 314, and a battery 316.

As shown in FIG. 3, the cavity 302 may be an area between the front 102 and the back 202 that may be formed when the front 102 and the back 202 are attached to one another. The cavity 302 may house various elements of the holiday apparatus 100. The interior of the back 304 may be the inward facing portion of the back 202 and may face toward the cavity 302. Although a plurality of LEDs 306A-N are shown, one or more LEDs may be used within the apparatus 100. The plurality of LEDs 306A-N may be through-hole LEDs, surface mount device (SMD) LEDs, high-power LEDs, RGB LEDs, ultraviolet LEDs, organic LEDs, chip-on-board LEDs filament LEDs, LED strips, miniature LEDs, and/or ceramic LEDs. The electrical wire 308 may be a single-core insulated wire, a multicore insulated wire, a jumper wire, a shielded wire, a twisted pair wire, a coaxial cable, a ribbon cable, and/or a hookup wire with alligator clips.

The compartment 310 may be a battery case/holder, a battery compartment, a battery cover, a casing with integrated battery, a slide-out tray, a sealed enclosure, a battery pack, a battery door, a waterproof casing, and/or a soft enclosure. The compartment 310 may have an Ingress Protection rating of 44 and/or higher. The compartment 310 may protect against the entry of solid objects larger than 1 mm, including but not limited to wires, screws, and/or large insects. The compartment 310 may protect against splashing water from any direction. The compartment 310 may prevent water from causing harmful effects when splashed against it.

The remote receiver 312 may be an infrared (IR) receiver, a radio frequency (RF) receiver, a bluetooth receiver, a wi-fi receiver, a Zigbee receiver, and/or a remote-controlled LED light strip. The timer 314 may be a mechanical timer, a digital timer, a countdown timer, an interval timer, an astronomical timer, a smart timer, a wifi timer, and/or a light timer. The battery 316 may be an alkaline battery, a lithium-ion battery, a lithium polymer battery, a silver oxide battery, a zinc carbon battery, a zinc-air battery, and/or a button cell battery.

As illustrated in FIG. 3, the holiday apparatus 100 may comprise the back 202. The back 202 may be formed from a plastic material. The back 202 may be attached to the front 102 (not shown) to form the cavity 302 between the front 102 and/or the back 202. The plurality of light-emitting diodes 306A-N may be affixed in the cavity 302 and the LEDs 306A-N may serve as a light source. The light-emitting diodes 306A-N may have an OFF mode, a constant ON mode, and/or at least one flashing mode. An adhesive, a plastic melt bond, a solder, a clamp, a hook-and-loop fastener, a clip, and/or a formed fit cavity may be used to connect the LEDs 306A-N to the interior of the back 304. The electrical wire 308 may be located within the cavity 302 and/or may be connected to a power source and/or the light-emitting diodes 306A-N.

The battery 316 may serve as the power source and/or may be at least partially embedded into the cavity 302. The battery 316 may provide an electrical current that may be carried through the electrical wire 308 to the light-emitting diodes 306A-N which may be affixed within the cavity 302. The holiday apparatus 100 may comprise a remote control system that may be connected to the battery 316. The remote control system may comprise the remote receiver 312 which may be at least partially embedded within the cavity 302. The remote receiver 312 may toggle the light-emitting diodes 306A-N between the OFF mode, the constant ON mode, and/or the at least one flashing mode. The remote receiver 312 may receive a signal from an external remote and/or may communicate with the battery 316 to toggle the plurality of LEDs 306A-N between the OFF mode, the constant ON mode, and/or the at least one flashing mode.

The holiday apparatus 100 may comprise a timer 314. The timer 314 may set time intervals between the constant ON mode, the OFF mode, and/or the at least one flashing mode of the LEDs 306A-N. The timer 314 may communicate with the battery 316 to toggle between the constant ON mode, the OFF mode, and/or the at least one flashing mode. A compartment 310 may be at least partially embedded in the cavity 302. The battery 316, the timer 314, and/or the remote receiver 312 may be secured and/or electrically connected to each other within the compartment 310. The electrical wire 308 may enter the compartment 310 to electrically communicate with the battery 316, the timer 314, and/or the remote receiver 312.

Figure 4:
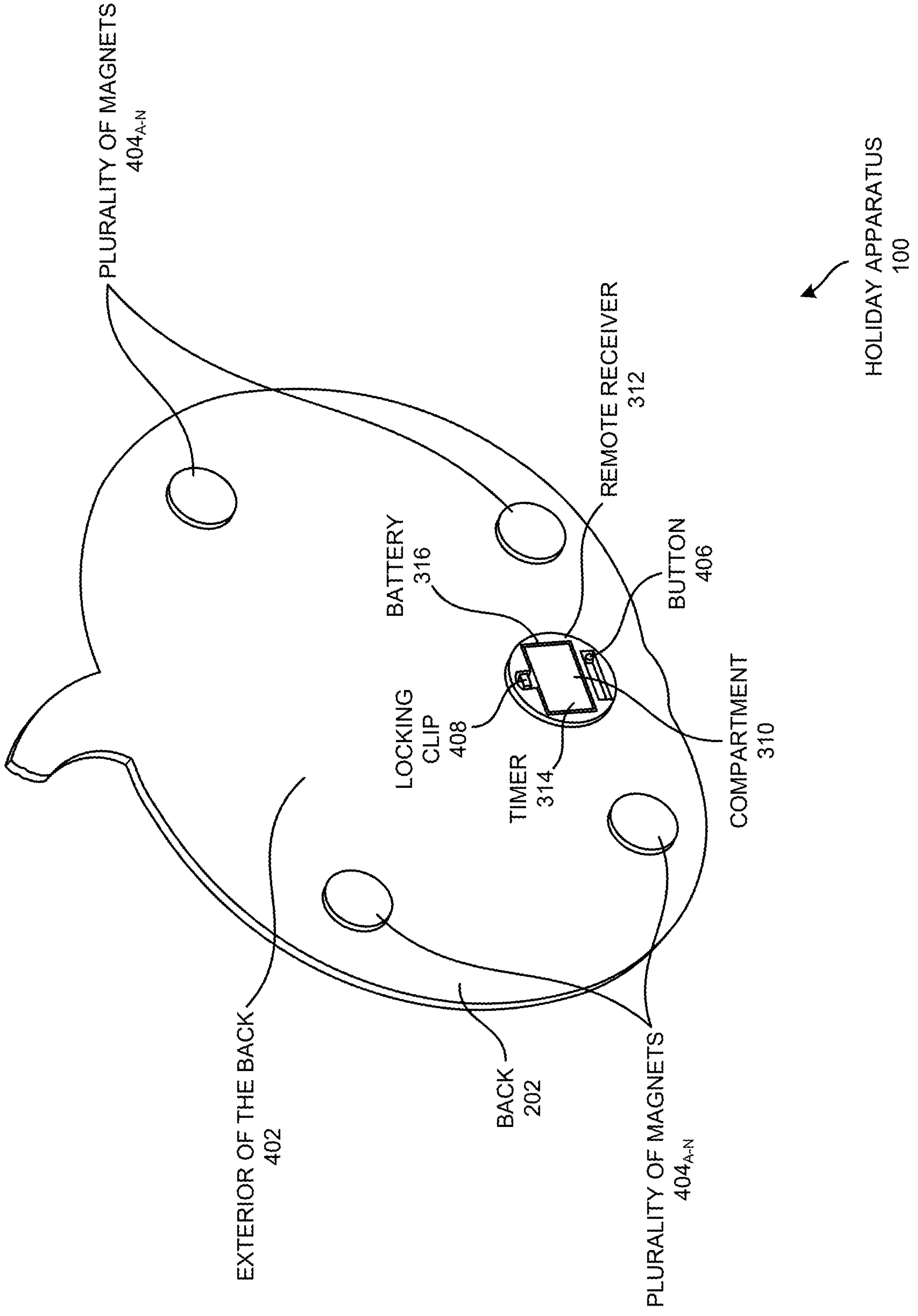
FIG. 4 is a back view of the holiday apparatus of FIG. 1A-FIG. 3, according to one embodiment.

FIG. 4 is a back view of the holiday apparatus 100 of FIG. 1A-FIG. 3, according to one embodiment. FIG. 4 illustrates the back 202, the compartment 310, the remote receiver 312, the timer 314, the battery 316, an exterior of the back 402, a plurality of magnets 404A-N, a button 406, and a locking clip 408.

As shown in FIG. 4, the exterior of the back 402 may be the outermost portion of the back 202 that faces away from the front 102 and/or the cavity 302. The plurality of magnets 404A-N may be neodymium magnets, ferrite magnets, alnico magnets, magnetic hooks, magnetic clips, magnetic strips, pot magnets, magnetic picture hangers, and/or magnetic tape. The button 406 may be a push-button switch, a slide switch, a toggle switch, a rocker switch, a dual in-line package switch, a tactile switch, a capacitive touch sensor, a proximity sensor, a rotary switch, and/or a soft power button. The button 406 may be used to toggle the light-emitting diodes 306A-N between the OFF mode, the constant ON mode, and/or the at least one flashing mode. The locking clip 408 may be a screw lock, a slide lock, a push-button lock, a hinge cover, a twist lock, a clip lock, a magnetic closure, a sliding latch, a snap-on cover, and/or a tool-release lock.

As illustrated in FIG. 4, one or more magnets 404A-N may be affixed to an exterior of the back 402 to removably attach the holiday apparatus 100 to a garage door 104. The magnets 404A-N may enable the apparatus to removably attach to a single panel 102 of the garage door 104. The magnets 404A-N may be of a strength to support the apparatus during the movement of the garage door 104. The holiday apparatus 100 may include a plurality of light-emitting diodes 306A-N (not shown).

The button 406 may toggle the light-emitting diodes 306A-N between an OFF mode, a constant ON mode, and/or at least one flashing mode. The button 406 may be located on the exterior portion of the compartment 310. The button 406 may be located on the exterior of the back 402. The button 406 may be used by a user for manual adjustment of the remote receiver 312 and/or the timer 314. The compartment 310 may at least partially protrude through the exterior of the back 402 in order to allow access to the remote receiver 312, the timer 314, and/or the battery 316. The locking clip 408 may secure the remote receiver 312, the timer 314, and/or the battery 316 within the compartment 310. The locking clip 408 may protect the remote receiver 312, the timer 314, and/or the battery 316 from outdoor elements and/or other potential damage.

Figure 5:
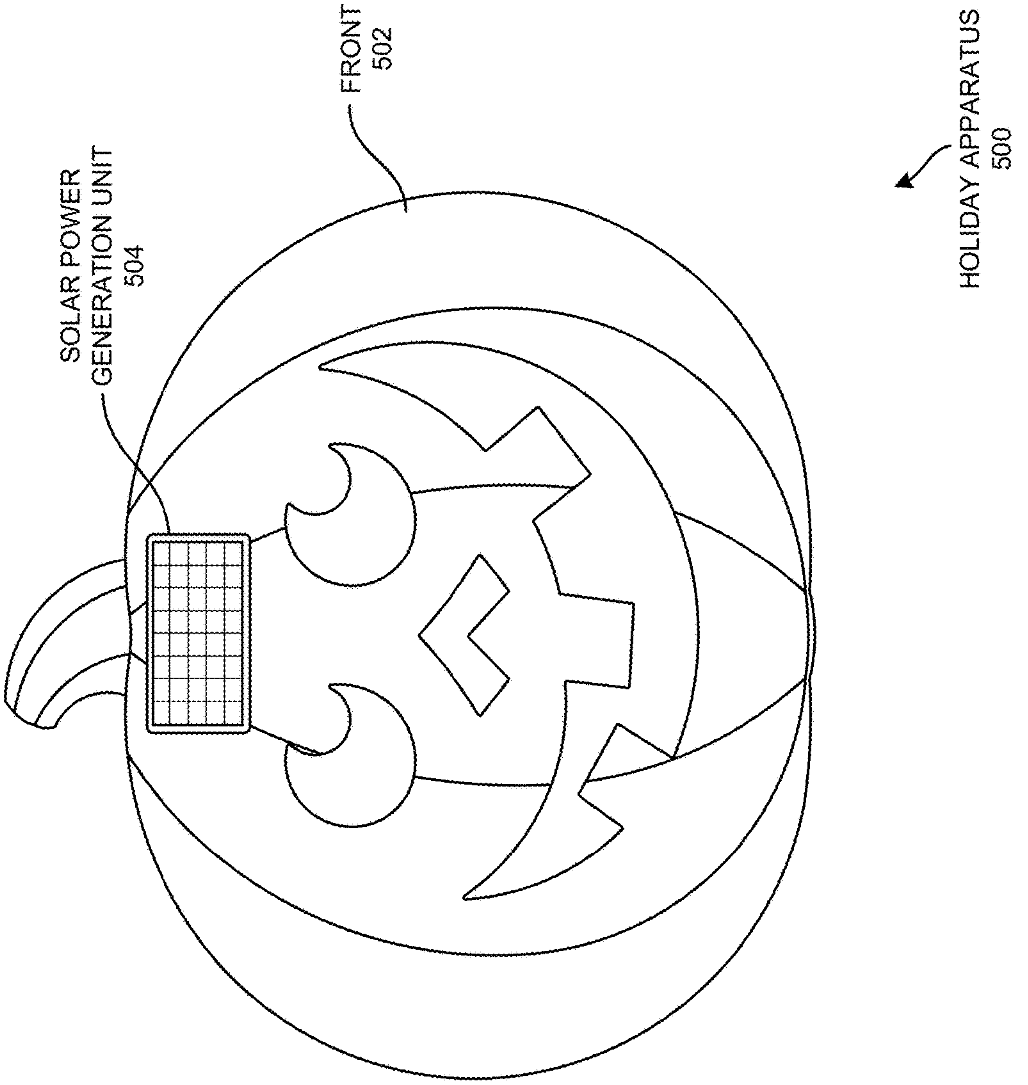
FIG. 5 is an alternative embodiment of the holiday apparatus of FIG. 1A-FIG. 4, according to one embodiment.

FIG. 5 is an alternative embodiment of the holiday apparatus 100 of FIG. 1A-FIG. 4, according to one embodiment. FIG. 5 illustrates a holiday apparatus 500 comprising a front 502 and a solar power generation unit 504. As shown in FIG. 5, the front 502 may be formed during a single mold process in which translucent material is manipulated in the form of the holiday apparatus 500. The solar power generation unit 504 may be a monocrystalline solar panel, a polycrystalline solar panel, an amorphous and/or thin-film solar panel, a CIGS (copper indium gallium selenide) solar panel, an organic solar panel, a folding or rollable solar panel, a solar panels with an integrated battery, a custom-shaped solar panel, and/or a micro or miniature solar panel.

Figure 6:
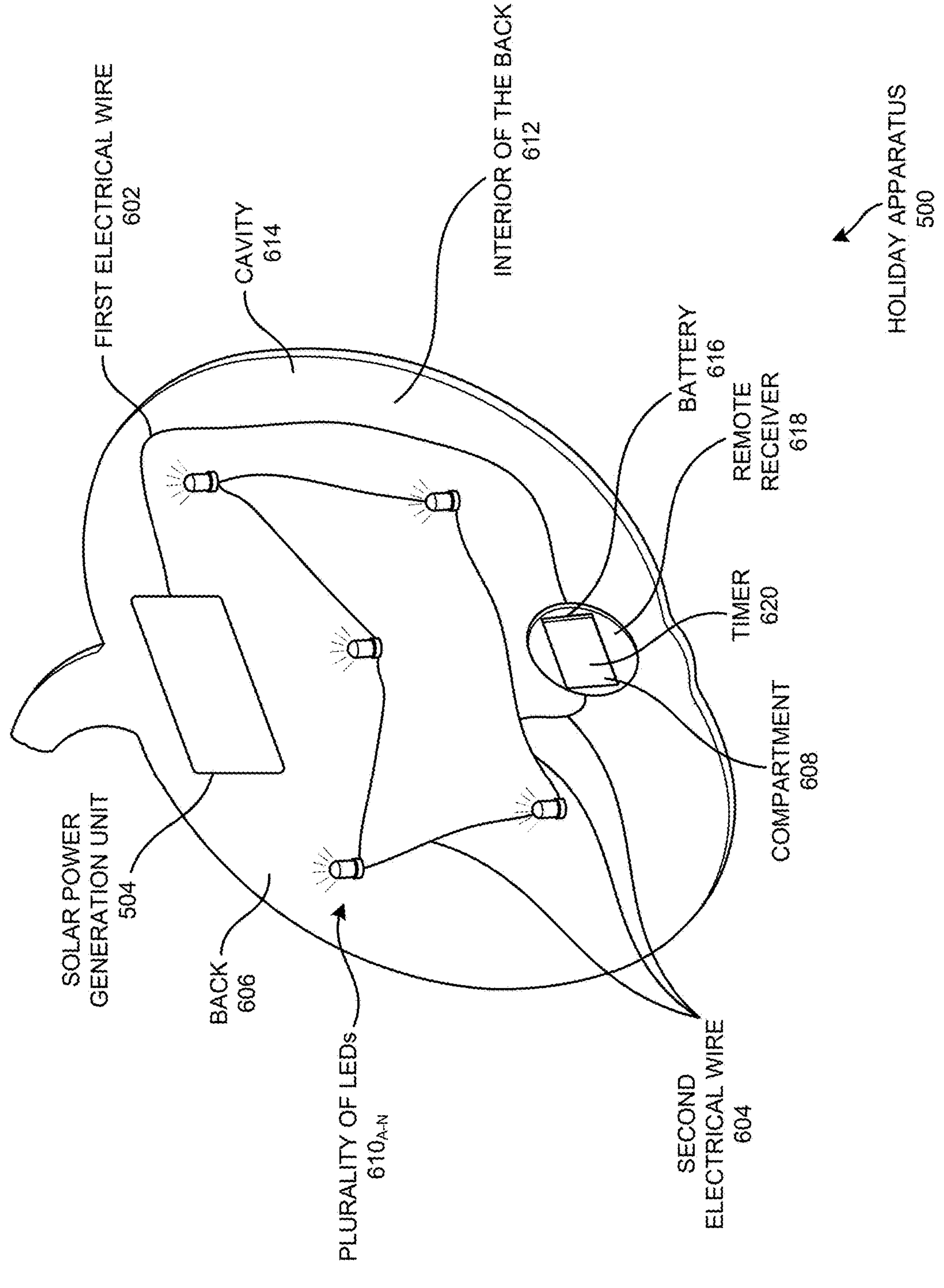
FIG. 6 is an internal view of the holiday apparatus of FIG. 5 in which the interior of the back is exposed, according to one embodiment.

FIG. 6 is an internal view of the holiday apparatus 500 of FIG. 5 in which the interior of the back 612 is exposed, according to one embodiment. FIG. 6 illustrates the solar power generation unit 504, a first electrical wire 602, a second electrical wire 604, a back 606, a compartment 608, a plurality of LEDs 610A-N, an interior of the back 612, a cavity 614, a battery 616, a remote receiver 618, and a timer 620.

As shown in FIG. 6, the first electrical wire 602 may be a single-core insulated wire, a multicore insulated wire, a jumper wire, a shielded wire, a twisted pair wire, a coaxial cable, a ribbon cable, and/or a hookup wire with alligator clips. The second electrical wire 604 may be a single-core insulated wire, a multicore insulated wire, a jumper wire, a shielded wire, a twisted pair wire, a coaxial cable, a ribbon cable, and/or a hookup wire with alligator clips. The back 606 may be the rear most portion of the apparatus 100 and/or may be formed from a single mold process. The back 606 may be made from a corrugated plastic, a foamed plastic, a honeycomb panel, a fiberglass reinforced panel, and/or a PVC board.

The compartment 608 may be a battery case/holder, a battery compartment, a battery cover, a casing with integrated battery, a slide-out tray, a sealed enclosure, a battery pack, a battery door, a waterproof casing, and/or a soft enclosure. The compartment 608 may be attached to the interior of the back 612 and/or may protrude through the back 606. The compartment 608 may protect against the entry of solid objects larger than 1 mm, including but not limited to wires, screws, and/or large insects. The compartment 608 may protect against splashing water from any direction. The compartment 608 may prevent water from causing harmful effects when splashed against it.

The plurality of LEDs 610A-N may be through-hole LEDs, surface mount device (SMD) LEDs, high-power LEDs, RGB LEDs, ultraviolet LEDs, organic LEDs, chip-on-board LEDs filament LEDs, LED strips, miniature LEDs, and/or ceramic LEDs. The interior of the back 612 may be the inward facing portion of the back 202 and/or may face toward the cavity 614. The cavity 614 may be an area between the front 502 and the back 606 that may be formed when the front 502 and the back 606 are attached to one another.

The battery 616 may be an alkaline battery, a lithium-ion battery, a lithium polymer battery, a silver oxide battery, a zinc carbon battery, a zinc-air battery, and/or a button cell battery. The remote receiver 618 may be an infrared (IR) receiver, a radio frequency (RF) receiver, a bluetooth receiver, a wi-fi receiver, a Zigbee receiver, and/or a remote-controlled LED light strip. The timer 620 may be a mechanical timer, a digital timer, a countdown timer, an interval timer, an astronomical timer, a smart timer, a wifi timer, and/or a light timer.

As shown in FIG. 6, the battery 616 may be charged by a solar power generation unit 504 which may be at least partially embedded within the cavity 614 and/or the front 502. The solar power generation unit 504 may be attached to the interior of the back 612 and/or may protrude through an opening in the front 502. The solar power generation unit 504 may generate power from light and/or transfer this power to the battery 616 via the first electrical wire 602. The first electrical wire 602 may be attached to the interior of the back 612 and/or may transfer power from the solar power generation unit 504 to the battery 616. After receiving power from the solar power generation unit 504, the battery 616 may store this power and/or directly transfer the power to the plurality of LEDs 610A-N via the second electrical wire 604. The second electrical wire 604 may be attached to the interior of the back 612.

The battery 616 may be housed within the compartment 608. The compartment 608 may also house the timer 620 and/or the remote receiver 618. The remote receiver 618 may be at least partially embedded within the cavity 614 and/or the compartment 608. The remote receiver 618 may toggle the LEDs 610A-N between an OFF mode, a constant ON mode, and/or at least one flashing mode. The remote receiver 618 may receive a signal from an external remote and/or may communicate with the battery 616 to toggle the LEDs 610A-N between the OFF mode, the constant ON mode, and/or the at least one flashing mode.

The holiday apparatus 500 may further comprise the timer 620. The timer 620 may set time intervals between the constant ON mode, the OFF mode, and/or the at least one flashing mode of the LEDs 610A-N. The timer 620 may communicate with the battery 616 to toggle between the constant ON mode, the OFF mode, and/or the at least one flashing mode. The timer 620 may be set and/or adjusted by pressing the button 702 (not shown). The timer 620 may be controlled by a dusk to dawn sensor 812 (not shown). The battery 616, the timer 620, and/or the remote receiver 618 may be secured and/or electrically connected to each other within the compartment 608. The second electrical wire 604 may enter the compartment 608 and/or may electrically communicate with the battery 616, the timer 620, the remote receiver 618, and/or the LEDs 610A-N.

The front 502 (not shown) may be attached to the back 606 and/or may protect the various components wholly and/or partially contained within the cavity 614. The front 502 may be a translucent material and/or may allow light to pass through when at least one of the LEDs 610A-N are being powered by the battery 616.

Figure 7:
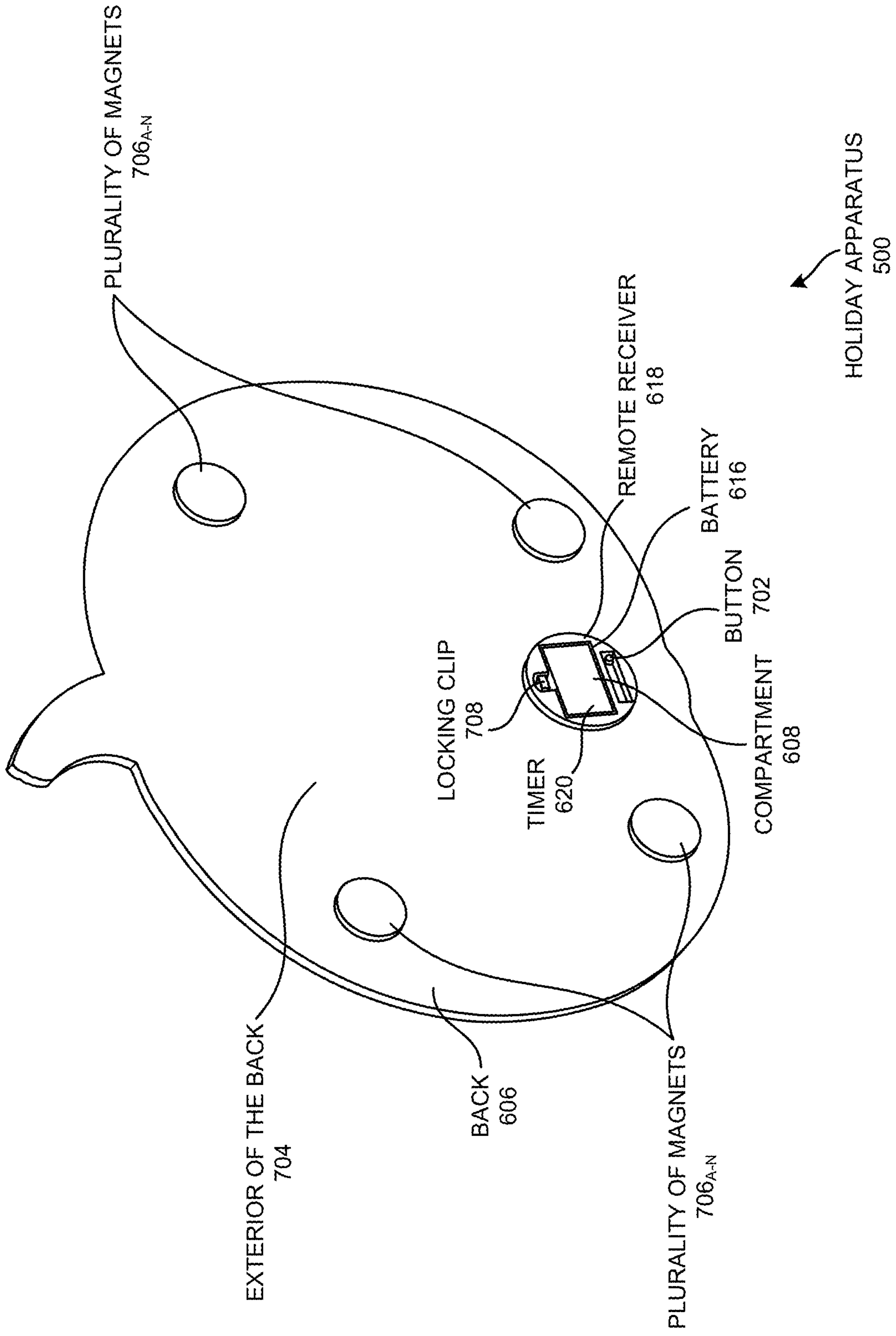
FIG. 7 is a back view of the holiday apparatus of FIG. 5 and FIG. 6, according to one embodiment.

FIG. 7 is a back view of the holiday apparatus 500 of FIG. 5 and FIG. 6, according to one embodiment. FIG. 7 Illustrates the back 606, the compartment 608, the battery 616, the remote receiver 618, the timer 620, a button 702, an exterior of the back 704, a plurality of magnets 706A-N, and a locking clip 708.

As shown in FIG. 7, the button 702 may be a push-button switch, a slide switch, a toggle switch, a rocker switch, a dual in-line package switch, a tactile switch, a capacitive touch sensor, a proximity sensor, a rotary switch, and/or a soft power button. The exterior of the back 704 may be the outermost portion of the back 606 that faces away from the front 502 and the cavity 614. The plurality of magnets 706A-N may be neodymium magnets, ferrite magnets, alnico magnets, magnetic hooks, magnetic clips, magnetic strips, pot magnets, magnetic picture hangers, and/or magnetic tape. The locking clip 708 may be a screw lock, a slide lock, a push-button lock, a hinge cover, a twist lock, a clip lock, a magnetic closure, a sliding latch, a snap-on cover, and/or a tool-release lock.

As illustrated in FIG. 7, the compartment 608 may at least partially protrude through the back 606 to the exterior of the back 704. The battery 616, the remote receiver 618, and/or the timer 620 may be housed in the compartment 608. The compartment 608 may at least partially protrude through the exterior of the back 704 in order to allow access to the battery 616, the remote receiver 618, and/or the timer 620. The locking clip 708 may secure the battery 616, the remote receiver 618, and/or the timer 620 within the compartment 608. The locking clip 708 may protect the battery 616, the remote receiver 618, and/or the timer 620 from outdoor elements and/or other potential damage.

The button 702 may be exposed on the outside of the compartment 608. The button 702 may toggle the LEDs 610A-N between an OFF mode, a constant ON mode, and/or at least one flashing mode. The button 702 may allow manual adjustment of the remote receiver 618 and/or the timer 620. One or more magnets 706A-N may be affixed to an exterior of the back 704 to removably attach the holiday apparatus 500 to a garage door 104. The magnets 706A-N may enable the apparatus to removably attach to a single panel 102 of the garage door 104. The magnets 706A-N may be of a strength to support the holiday apparatus 500 during the movement of the garage door 104.

Figure 8:
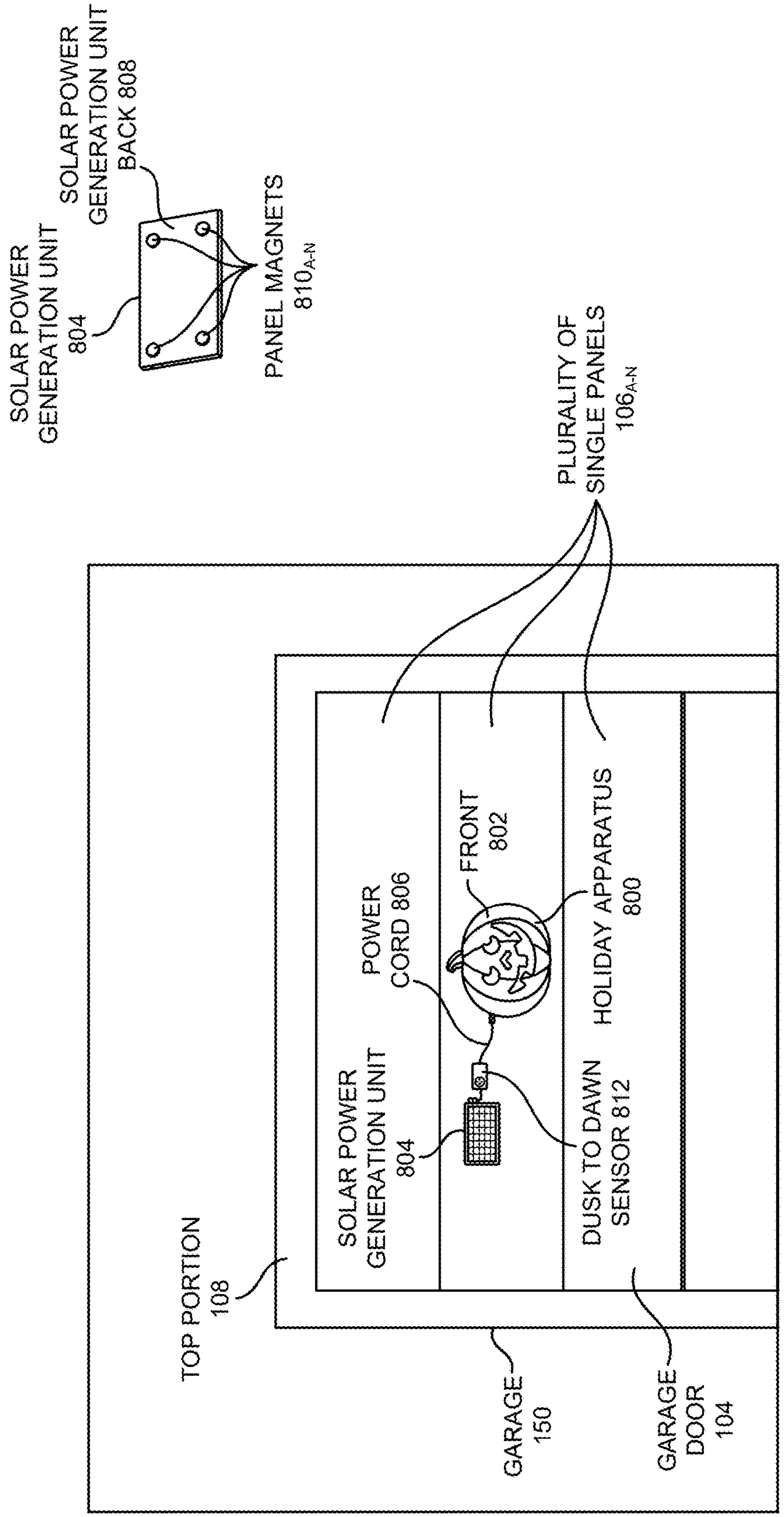
FIG. 8 is an alternative embodiment of the holiday apparatus of FIG. 1A-FIG. 4, and FIG. 5-7, according to one embodiment.

FIG. 8 is an alternative embodiment of the holiday apparatus 800 of FIG. 1A-FIG. 4, and FIG. 5-7, according to one embodiment. FIG. 8 illustrates the garage door 104, the plurality of single panels 106A-N, the top portion 108, a holiday apparatus 800, a front 802, an external solar power generation unit 804, a power cord 806, a solar power generation unit back 808, one or more panel magnets 810A-N, and a dusk to dawn sensor 812.

The external solar power generation unit 804 may be one or more solar panels including but not limited to a monocrystalline solar panel, a polycrystalline solar panel, an amorphous solar panel, and/or other types of solar panels. The external solar power generation unit 804 may generate electrical power by converting solar energy into electrical energy. The external solar power generation unit 804 may be connected to the garage door 104 via a one or more panel magnets 810A-N. The external solar power generation unit 804 may connect to the power cord 806 to transfer the generated electrical energy to the battery 316. The external solar power generation unit 804 may include a solar power generation unit back 808, which may provide structural support and/or house various components, including but not limited to the power cord 806 and/or the battery 316. The battery 316 may be charged by the external solar power generation unit 804 that may be connected to the battery 316 via the power cord 806. The external solar power generation unit 804 may directly power the holiday apparatus 800 without charging the battery 316.

The power cord 806 may be an insulated electrical wire that transfers electrical energy from the external solar power generation unit 804 to the battery 316. The power cord 806 may be made from materials including but not limited to copper, aluminum, and/or other conductive materials. The power cord 806 may connect the external solar power generation unit 804 to the battery 316 which may ensure the flow of electrical current throughout the holiday apparatus 800.

The solar power generation unit back 808 may be the rear support structure for the external solar power generation unit 804. The solar power generation unit back 808 may be made from materials including but not limited to plastic, metal, and/or composite materials. The solar power generation unit back 808 may provide a mounting surface for the external solar power generation unit 804 and/or may house at least a portion of the power cord 806. The solar power generation unit back 808 may be attached to and/or be a part of the external solar power generation unit 804 and may provide necessary structural integrity and/or housing. The solar power generation unit back 808 may be affixed to the garage door 104 via a one or more panel magnets 810A-N.

The one or more panel magnets 810A-N may be various magnet types including but not limited to neodymium magnets, ferrite magnets, and/or other types of magnets. The one or more panel magnets 810A-N may be affixed to the solar power generation unit back 808 using methods including but not limited to adhesives, screws, and/or clips. The one or more panel magnets 810A-N may secure the external solar power generation unit 804 to the garage door 104 which may allow the holiday apparatus 800 to be powered by the energy generated by the external solar power generation unit 804. The one or more panel magnets 810A-N may be of a strength to support the external solar power generation unit 804 during the movement of the garage door 104.

The dusk to dawn sensor 812 may be a photoelectric sensor that automatically controls the holiday apparatus 800 based on ambient light levels. The dusk to dawn sensor 812 may detect the onset of dusk and trigger the lighting elements of the holiday apparatus 800 to turn on. Conversely, at dawn, the dusk to dawn sensor 812 may turn the lights off to conserve energy.

The dusk to dawn sensor 812 may be integrated into the circuitry of the holiday apparatus 800 and/or may be connected via electrical wiring to the power source, which may be a battery charged by the external solar power generation unit 804 or an external power source. The dusk to dawn sensor 812 may be integrated into and/or attached to the power cord 806. The dusk to dawn sensor 812 may work in conjunction with the timer (not shown) to set specific intervals for the lighting modes, including OFF, constant ON, and/or flashing modes. The timer (not shown) may be controlled by the dusk to dawn sensor 812. The dusk to dawn sensor 812 may allow the holiday apparatus 800 to function efficiently, providing illumination only when needed and thus enhancing the energy efficiency and/or longevity of the device.

Additionally, the dusk to dawn sensor 812 may be adjustable to cater to different sensitivity levels and/or specific user requirements. This adjustment may involve setting the sensor to detect varying levels of ambient light to ensure optimal operation under different environmental conditions According to one or more embodiments, FIG. 8 discloses the holiday apparatus 800 comprising the front 802. The holiday apparatus 800 may be attached to a single panel 106 of the plurality of single panels 106A-N of the garage door 104 of the garage 150 via one or more magnets (not shown). The holiday apparatus 800 may be attached to an external solar power generation unit 804 via a power cord 806. The power cord 806 may move power generated by the external solar power generation unit 804 to the holiday apparatus 800. The power generated from the external solar power generation unit 804 may directly power the holiday apparatus 800 and/or charge a battery (not shown), which may then power the holiday apparatus 800.

The external solar power generation unit 804 may attach to one single panel 106 of the plurality of single panels 106A-N of the garage door 104 of the garage 150 via one or more panel magnets 810A-N. The panel magnets 810A-N may be attached to the solar power generation unit back 808 and may support the external solar power generation unit 804 during the movement of the garage door 104 to ensure the external solar power generation unit 804 does not fall off of the garage door 104. The external solar power generation unit 804 may be less than 2.25 inches in depth so as not to contact a top portion of the garage 150 during the movement of the garage door 104.

A dusk to dawn sensor 812 may be attached to one or more of the holiday apparatus 800, the front 802 of the holiday apparatus 800, the external solar power generation unit 804, the power cord 806, and/or one single panel 106 of the plurality of single panels 106A-N of the garage door 104. The dusk to dawn sensor 812 may be pointed away from the garage 150 and/or toward an area where sunlight may be collected.

Figure 9:
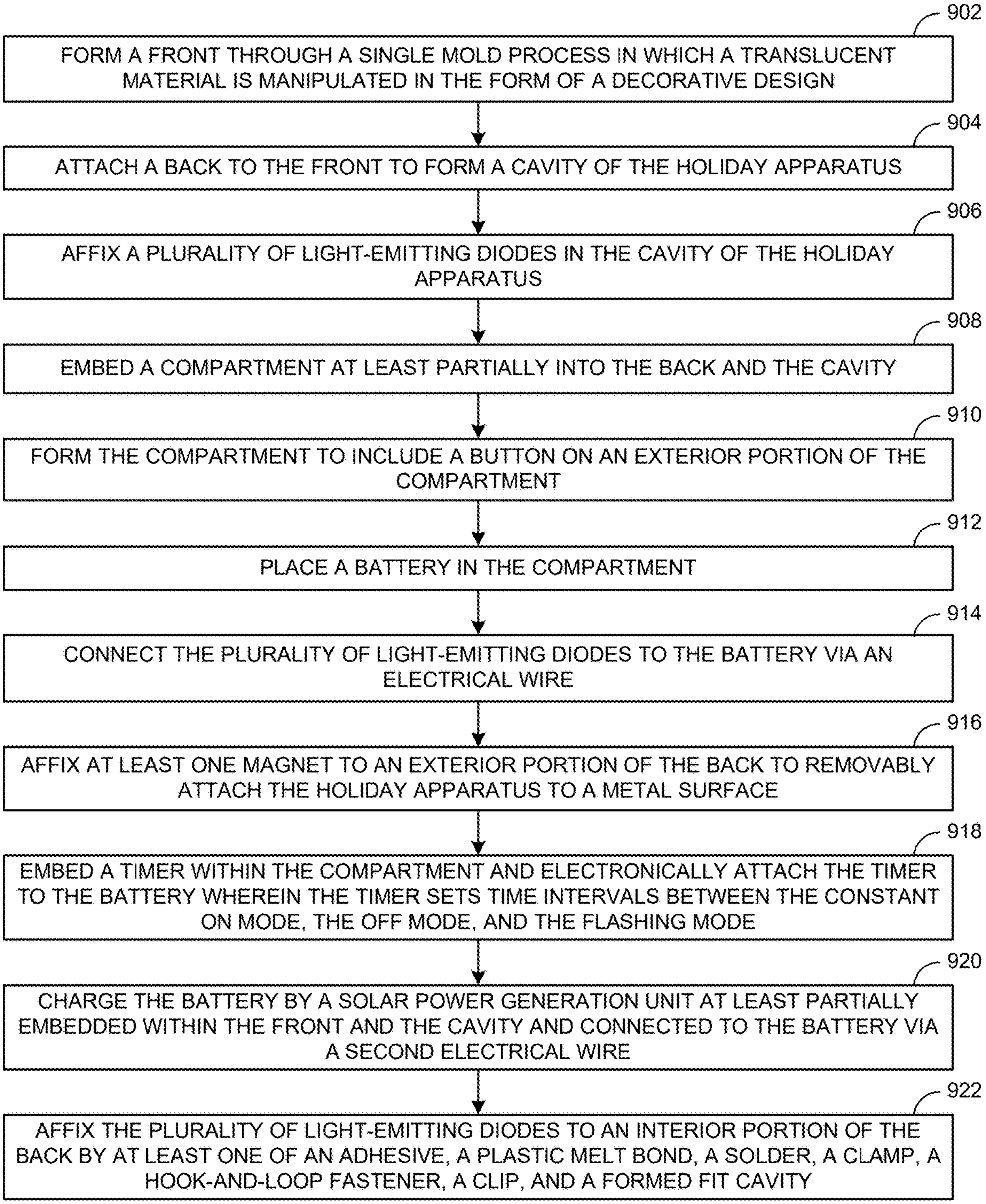
FIG. 9 is a process flow diagram describing a method of manufacturing the holiday apparatus of FIG. 1A-FIG. 4, FIG. 5-FIG. 7, and FIG. 8, according to one embodiment.

FIG. 9 is a process flow diagram describing a method of manufacturing the holiday apparatus of FIG. 1A-FIG. 4, FIG. 5-FIG. 7, and FIG. 8, according to one embodiment.

In operation 902, a front may be formed through a single mold process in which a translucent material is manipulated in the form of a decorative design. In operation 904, a back may attach to the front to form a cavity of the holiday apparatus. In operation 906, a plurality of light-emitting diodes may be affixed in the cavity of the holiday apparatus. In operation 908, a compartment may be embedded at least partially into the back and the cavity. In operation 910, the compartment may be formed to include a button on an exterior portion of the compartment. In operation 912, a battery may be placed in the compartment. In operation 914, the plurality of light-emitting diodes may be connected to the battery via an electrical wire. In operation 916, at least one magnet may be affixed to an exterior portion of the back to removably attach the holiday apparatus to a metal surface. In operation 918, a timer may be embedded within the compartment and electronically attaching the timer to the battery wherein the timer sets time intervals between the constant ON mode, the OFF mode, and the at least one flashing mode. In operation 920, the battery may be charged by a solar power generation unit at least partially embedded within the front and the cavity and connected to the battery via a second electrical wire. In operation 922, the plurality of light-emitting diodes may be affixed to an interior portion of the back by at least one of an adhesive, a plastic melt bond, a solder, a clamp, a hook-and-loop fastener, a clip, and a formed fit cavity.

Decorating for holidays may connect individuals and families to their cultural and religious heritage, and may be a way of passing down traditions to future generations. Decorations and artistic apparatuses may be placed on and around buildings and dwellings, but placing a decoration on the door of a garage may be risky because of the moving nature of a garage door. Decorations may contact the upper frame of the garage opening and/or may become stuck and/or damaged by the garage door hardware. As a result of potential damage to the garage, the garage door, the garage door hardware, and/or holiday decoration, garage doors are often neglected when a building and/or dwelling is decorated.

The embodiments of FIGS. 1A-9 may remedy the risks involved with decorating a garage for a holiday and/or cultural event. The embodiments of FIGS. 1A-9 may produce decorative lighting and festive feng shui without there being a risk of damaging the garage, the garage door, the garage door hardware, and/or the holiday decoration. As a result of the decreased risk of damage, The embodiments of FIGS. 1A-9 may allow users to be less likely to be injured in their garages as damage to the garage door may be limited. Furthermore, The embodiments of FIGS. 1A-9 may save users money by limiting potential garage door damage. The embodiments of FIGS. 1A-9 may provide for extra decorating space while also allowing for customized time interval settings which may allow for decreased energy use and increased creativity. The embodiments of FIGS. 1A-9 may also allow for easy removal and storage of holiday decorations.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

The invention claimed is:

1. A holiday apparatus comprising:

a front formed of a translucent material in which a light source within a cavity illuminates the holiday apparatus, wherein the front is primarily formed from a single mold process in which the translucent material is manipulated in a form of the front;

a back formed from a plastic material, wherein the back is attached to the front to form the cavity between the front and the back, wherein when the front and the back are attached, an apparatus depth is less than a door clearance to ensure the holiday apparatus does not impede movement of a garage door by contacting a top portion, wherein the apparatus depth is less than 2.25 inches;

at least one light-emitting diode affixed in the cavity serving as the light source;

an electrical wire located within the cavity connected to a power source and the at least one light-emitting diode;

a compartment containing a battery serving as the power source, wherein the compartment is embedded at least partially through an exterior of the back into the cavity wherein the battery provides an electrical current carried through the electrical wire to the at least one light-emitting diode affixed within the cavity;

and at least one magnet affixed to an exterior portion of the back to removably attach the holiday apparatus to the garage door, wherein the at least one magnet is of a strength to support the apparatus during movement of the garage door.

2. The holiday apparatus of claim 1 wherein the at least one light-emitting diode comprises an OFF mode, a constant ON mode, and at least one flashing mode.

3. The holiday apparatus of claim 2 wherein a button toggles the at least one light-emitting diode between the OFF mode, the constant ON mode, and the at least one flashing mode.

4. The holiday apparatus of claim 2 further comprising:

a timer to set time intervals between the constant ON mode, the OFF mode, and the at least one flashing mode.

5. The holiday apparatus of claim 1 wherein the battery is charged by a solar power generation unit that is at least partially embedded within the cavity.

6. The holiday apparatus of claim 1 wherein the battery is charged by an external solar power generation unit that is connected to the battery via a power cord.

7. The holiday apparatus of claim 1 further comprising:

at least one of an adhesive, a plastic melt bond, a solder, a clamp, a hook-and-loop fastener, a clip, and a formed fit cavity to connect the at least one light-emitting diode to an interior portion of the back.

8. The holiday apparatus of claim 1 further comprising:

a remote control system connected to the battery wherein a remote receiver is embedded at least partially within the cavity and toggles the at least one light-emitting diode between the OFF mode, the constant ON mode, and the at least one flashing mode.

9. The holiday apparatus of claim 1 wherein the back is made from at least one of a corrugated plastic, a foamed plastic, a honeycomb panel, a fiberglass reinforced panel, and a PVC board.

10. A method of manufacturing a holiday apparatus comprising:

forming a front through a single mold process in which a translucent material is manipulated in the form of a decorative design, wherein the translucent material is a material in which a light within a cavity of the holiday apparatus illuminates the holiday apparatus interiorly and exteriorly;

attaching a back to the front to form a cavity of the holiday apparatus;

affixing a plurality of light-emitting diodes in the cavity of the holiday apparatus;

embedding a compartment at least partially into the back and the cavity;

forming the compartment to include a button on an exterior portion of the compartment;

placing a battery in the compartment;

connecting the plurality of light-emitting diodes to the battery via an electrical wire; and affixing at least one magnet to an exterior portion of the back to removably attach the holiday apparatus to a metal surface.

11. The method of manufacturing the holiday apparatus of claim 10 wherein the button toggles the plurality of light-emitting diodes between an OFF mode, a constant ON mode, and at least one flashing mode.

12. The method of manufacturing the holiday apparatus of claim 11 further comprising:

embedding a timer within the compartment and electronically attaching the timer to the battery wherein the timer sets time intervals between the constant ON mode, the OFF mode, and the at least one flashing mode.

13. The method of manufacturing the holiday apparatus of claim 10 further comprising:

charging the battery by a solar power generation unit at least partially embedded within the front and the cavity and connected to the battery via a second electrical wire.

14. The method of manufacturing a holiday apparatus of claim 10 further comprising:

affixing the plurality of light-emitting diodes to an interior portion of the back by at least one of an adhesive, a plastic melt bond, a solder, a clamp, a hook-and-loop fastener, a clip, and a formed fit cavity.

15. A holiday apparatus comprising:

a front formed of a translucent material in which a light source within a cavity illuminates the holiday apparatus, wherein the front is formed from a single mold process in which the translucent material is manipulated in a form of the front;

a back formed from a plastic material, wherein the back is attached to the front by an adhesive to form the cavity between the front and the back, and wherein the depth formed by adhering the back to the front is less than 2.2 inches;

a plurality of light-emitting diodes that serve as the light source and are affixed to an interior portion of the back;

a compartment containing a battery that serves as a power source, wherein the compartment is embedded at least partially through an exterior of the back into the cavity to allow access to the battery;

a first electrical wire affixed to the interior portion of the back electrically connecting the plurality of light-emitting diodes to the battery, wherein the battery provides an electrical current carried through the first electrical wire to the plurality of light-emitting diodes which are affixed within the cavity to the interior portion of the back;

a solar power generation unit embedded at least partially within the front and the cavity, wherein the solar power generation unit charges the battery and is electrically attached to the battery via a second electrical wire;

a timer housed within the compartment is electronically connected to the battery to automatically toggle the plurality of light-emitting diodes between at least an OFF mode, a constant ON mode, and at least one flashing mode; and at least two magnets affixed to the exterior of the back to removably attach the holiday apparatus to a garage door.

16. The holiday apparatus of claim 15 wherein the compartment protects against the entry of solid objects larger than 1 mm, and wherein the compartment protects against splashing water from any direction.

17. The holiday apparatus of claim 15 wherein a button toggles the plurality of light-emitting diodes between the OFF mode, the constant ON mode, and the at least one flashing mode.

18. The holiday apparatus of claim 15 further comprising:

a remote control system connected to the battery wherein a remote receiver is embedded at least partially within the compartment and toggles the plurality of light-emitting diodes between the OFF mode, the constant ON mode, and the at least one flashing mode.

19. The holiday apparatus of claim 15 wherein the plurality of light-emitting diodes is affixed to the interior portion of the back by at least one of an adhesive, a plastic melt bond, a solder, a clamp, a hook-and-loop fastener, a clip, and a formed fit cavity.

20. The holiday apparatus of claim 16 wherein the timer is controlled by a dusk to dawn sensor.

* * * * *